(12) United States Patent
Nakakita et al.

(10) Patent No.: US 8,061,711 B2
(45) Date of Patent: Nov. 22, 2011

(54) SHEET CONVEYOR AND IMAGE READING APPARATUS

(75) Inventors: Satoru Nakakita, Nagoya (JP); Akihiro Sakakibara, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 308 days.

(21) Appl. No.: 11/963,621

(22) Filed: Dec. 21, 2007

(65) Prior Publication Data
US 2008/0150222 A1 Jun. 26, 2008

(30) Foreign Application Priority Data

Dec. 26, 2006 (JP) ................................. 2006-348778

(51) Int. Cl.
*B65H 9/04* (2006.01)
(52) U.S. Cl. ........................................ 271/245; 271/226
(58) Field of Classification Search .................. 271/226, 271/245
See application file for complete search history.

(56) References Cited

U.S. PATENT DOCUMENTS

| | | | | |
|---|---|---|---|---|
| 3,869,202 A * | 3/1975 | Tabata et al. | .................. | 399/401 |
| 4,109,779 A * | 8/1978 | Bauer et al. | .................. | 400/584 |
| 4,519,700 A * | 5/1985 | Barker et al. | .................. | 399/394 |
| 4,850,581 A * | 7/1989 | Hayakawa et al. | ........ | 271/10.06 |
| 5,395,104 A * | 3/1995 | Harada et al. | .................. | 271/256 |
| 5,499,804 A * | 3/1996 | Harada et al. | .................. | 271/3.02 |
| 5,597,154 A * | 1/1997 | Yamashita | .................. | 271/10.05 |
| 5,881,350 A | 3/1999 | Wada et al. | | |
| 6,618,575 B2 * | 9/2003 | Takida et al. | .................. | 399/367 |
| 6,877,742 B2 * | 4/2005 | Nishikata et al. | ............. | 271/264 |
| 7,021,618 B2 * | 4/2006 | Watanabe et al. | ............ | 271/3.14 |
| 7,032,900 B2 * | 4/2006 | Nishikata et al. | ............. | 271/264 |
| 7,403,314 B2 * | 7/2008 | Tsuchiya | .................... | 358/498 |
| 7,573,618 B2 * | 8/2009 | Tsai et al. | ..................... | 358/498 |

(Continued)

FOREIGN PATENT DOCUMENTS

CN 1099157 A 2/1995

(Continued)

OTHER PUBLICATIONS

Japan Patent Office, Notice of Reasons for Rejection for Patent Application No. JP 2006-348778 (counterpart to above-captioned patent application), mailed Dec. 7, 2010.

(Continued)

*Primary Examiner* — Stefanos Karmis
*Assistant Examiner* — Howard Sanders
(74) *Attorney, Agent, or Firm* — Baker Botts L.L.P.

(57) ABSTRACT

A sheet conveyor includes a conveying path along which a sheet is conveyed and a transparent member disposed on the conveying path and including a surface facing the sheet being conveyed. The transparent member including a reference line extending across the transparent member in a direction perpendicular to the conveying direction. The sheet conveyor further includes a guide member comprising a guide edge that includes a first guide edge and a second guide edge, the guide edge having a shape, such that a distance from the guide edge to the reference line varies in the direction in which the reference line extends. The guide edge further may include a first guide portion and a second guide portion. The guide member is disposed upstream of the transparent member in a conveying direction of the sheet, and the guide member is configured to guide the sheet to the transparent member. The first guide portion may include a first guide edge disposed separate from a reference line by a first distance. The second guide portion also may include a second guide edge disposed separate from the reference line by a second distance different from the first distance.

11 Claims, 7 Drawing Sheets

U.S. PATENT DOCUMENTS

2001/0033761 A1* 10/2001 Takida et al. .................. 399/367
2003/0141654 A1    7/2003 Nishikata et al.
2004/0234304 A1* 11/2004 Tsuchiya ...................... 399/316

FOREIGN PATENT DOCUMENTS

| CN | 1435990    | A | 8/2003  |
|----|------------|---|---------|
| JP | H01-162651 | A | 6/1989  |
| JP | H03-47541  | U | 5/1991  |
| JP | H04-029543 | U | 3/1992  |
| JP | H07-251976 | A | 10/1995 |
| JP | H10-139211 | A | 5/1998  |
| JP | 2000-211763| A | 8/2000  |
| JP | 2002-218169| A | 8/2002  |
| JP | 2003-051915| A | 2/2003  |
| JP | 2003-092662| A | 3/2003  |
| JP | 2004-269098| A | 9/2004  |
| JP | 2006-246058| A | 9/2006  |

OTHER PUBLICATIONS

The State Intellectual Property Office of the People'S Republic of China, Notification of the Second Office Action for Chinese Patent Application No. 200710305305.3 (counterpart to above-captioned patent application), issued Aug. 24, 2011.

* cited by examiner

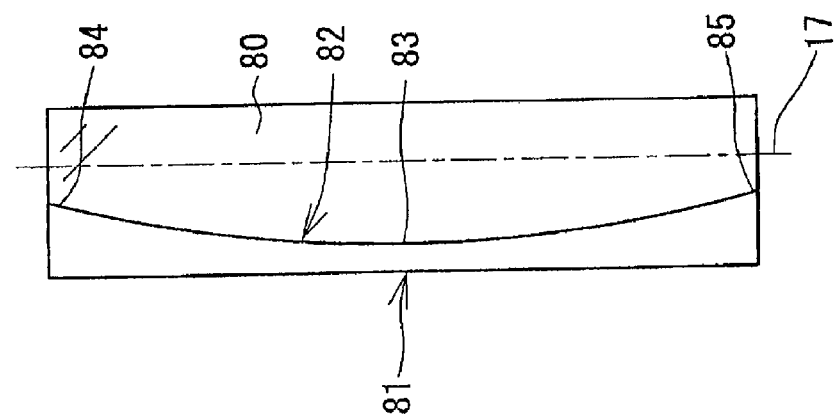
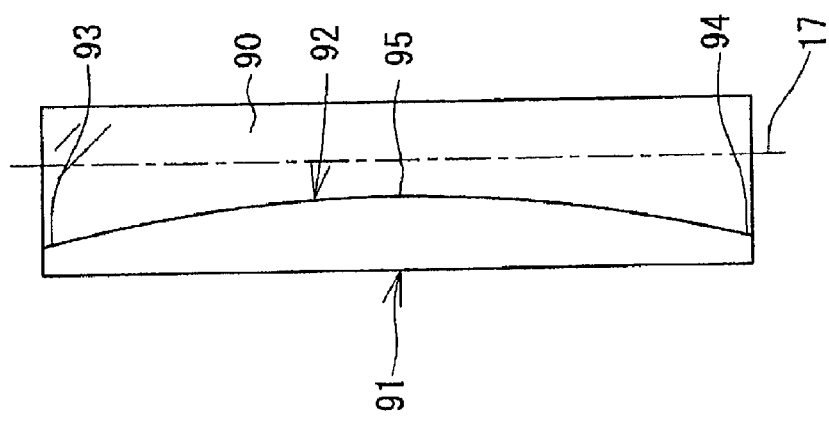
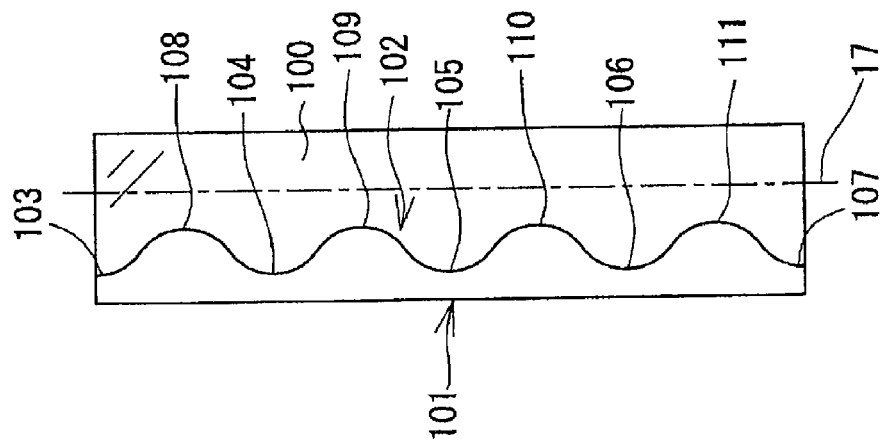

SHEET CONVEYOR AND IMAGE READING APPARATUS

CROSS-REFERENCE TO RELATED APPLICATION

This application claims the benefit of Japanese Patent Application No. 2006-348778, filed Dec. 26, 2006, the disclosure of which is incorporated herein by reference.

BACKGROUND OF THE INVENTION

1. Field of the Invention

The present invention relates to a sheet conveyor that comprises a conveying path along which a sheet is conveyed, a transparent member disposed on the conveying path and facing the sheet being conveyed, and a guide member disposed upstream of the transparent member in a conveying direction of the sheet and guiding the sheet to the transparent member. The present invention also relates to an image reading apparatus comprising such a sheet conveyor.

2. Description of Related Art

Facsimile, copier, and scanner devices equipped with automatic document feeders (which hereinafter are referred to as ADFs) are known. An ADF conveys documents sequentially along a conveying path extending between a feed tray and a catch tray and allows each document to face a contact glass plate in the course of the conveying process. An image sensor is disposed at a position corresponding to the contact glass plate. Such an image sensor reads an image on a document conveyed thereto through the contact glass plate. Such a document-conveying process in an ADF is achieved by means of a sheet conveyor.

In such a sheet conveyor, a guide is configured to smoothly guide a document to the contact glass plate. For example, in Japanese Unexamined Patent Application Publication No. H10-139211 A, guiding means elastically nip a document from above and below. In Japanese Unexamined Utility Model Application Publication No. H04-29543 U, a brush is pushed down by a conveyed document and extends across the boundary between the document and a contact glass plate. In Japanese Unexamined Patent Application Publication No. H01-162651 A, a guide member is held at a predetermined, adjacent position and faces a contact glass plate.

When a guide is disposed upstream of a contact glass plate in the conveying direction, a certain step is formed between the guide and the contact glass plate to achieve higher assembly precision and to allow the leading end of a document to be conveyed smoothly. Nevertheless, when the trailing end of a document passes over this step, the document tends to behave in a specific manner. For example, when the trailing end of a document drops from the step onto the contact glass plate, the impact may cause such a specific behavior to occur on the document. Such behavior by the document may reduce the quality of an image read through the contact glass plate. Such reduced quality of a read image occurring due to the specific behavior by the document also is referred to as a specific reading defect.

SUMMARY OF THE INVENTION

Accordingly, a need has arisen for a sheet conveyor that may suppress a specific behavior of a sheet when the trailing end of the sheet is guided to a transparent member to prevent or mitigate the reduction in the quality of an image read through the transparent member.

In an embodiment of this invention, a sheet conveyor may comprise a conveying path along which a sheet is conveyed, a transparent member, and a guide member. The transparent member may be disposed in the conveying path and may comprise a surface facing the conveyed sheet and a reference line extending across the transparent member in a direction perpendicular to the conveying direction. The guide member may comprise a guide edge that comprises a first guide edge and a second guide edge. The guide edge has a shape, such that a distance from the guide edge to the reference line varies in the direction in which the reference line extends.

According to such a guide member, the trailing end of the sheet is guided continuously, but at different times, to the transparent member across the width of the sheet. Accordingly, when the trailing end of the sheet is guided gradually onto the transparent member, the sheet is prevented from behaving unexpectedly (e.g., from demonstrating a specific reading defect).

In another embodiment of this invention, a sheet conveyor may comprise a conveying path along which a sheet is conveyed, a transparent member, and a guide member. The transparent member may be disposed on the conveying path and may comprise a surface facing the sheet being conveyed. The guide member may comprise a first guide portion and a second guide portion. The guide member may be disposed upstream of the transparent member in a conveying direction of the sheet. The guide member may guide the sheet to the transparent member, and the first guide portion may be configured to guide a first section of a trailing end of the sheet towards the transparent member, and the second guide portion may be configured to guide a second section of the trailing end of the sheet toward the transparent member at a different point from that of the first guide portion in the conveying direction of the sheet.

In still another embodiment of this invention, an image reading apparatus may comprise the sheet conveyor, as described above, and an image sensor. The image sensor may be configured to read an image on the sheet conveyed along the conveying path through the transparent member.

Other objects, features, and advantages of the present invention will be understood from the following detailed description of preferred embodiments of the present invention with reference to the accompanying figures.

BRIEF DESCRIPTION OF THE DRAWINGS

For a more complete understanding of the present invention, and the needs satisfied thereby, reference now is made to the following descriptions taken in connection with the accompanying drawings.

FIGS. 6A to 6C depict modified examples of a guide edge between a first guide portion and a second guide portion.

DETAILED DESCRIPTION OF PREFERRED EMBODIMENTS

Embodiments of the present invention now are described with reference to the drawings. The embodiments described below are only examples of the invention, and it is understood that various modifications of the embodiments are permissible without departing from the scope of the invention.

Figure 1:
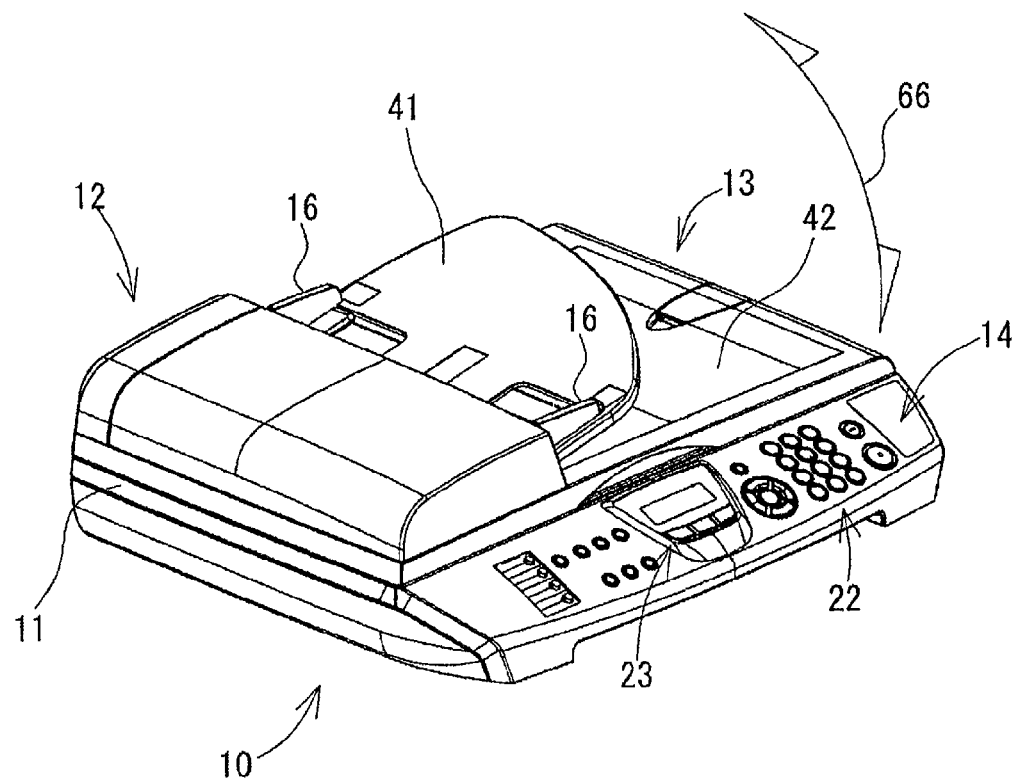
FIG. 1 is a perspective view depicting the external configuration of an image reading apparatus 10 according to a first embodiment of the invention.
Figure 2:
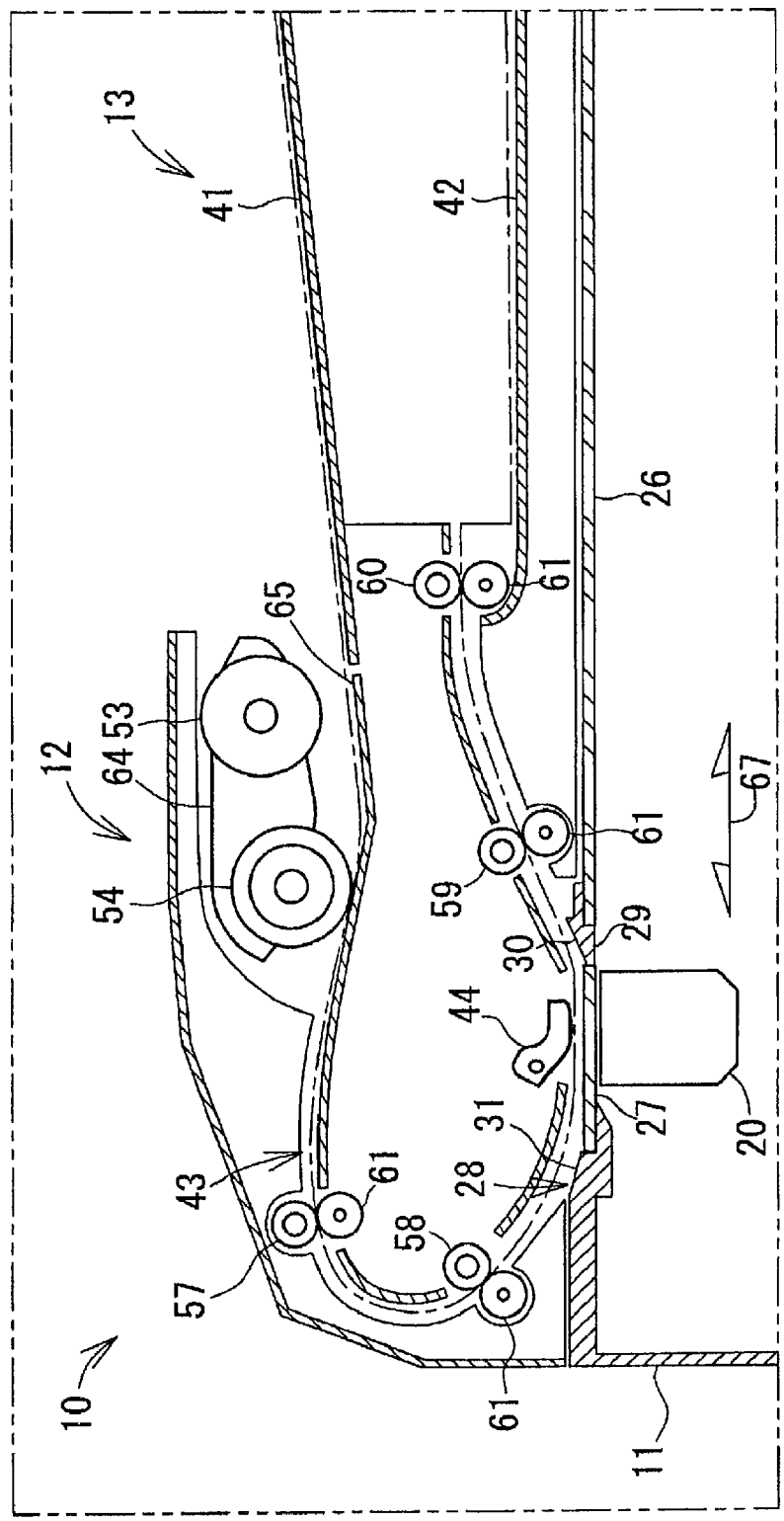
FIG. 2 is a cross-sectional view depicting the internal configuration of an image reading apparatus 10.

FIG. 1 is a perspective view depicting the external configuration of image reading apparatus 10 according to a first embodiment of the invention. FIG. 2 is a cross-sectional view depicting the internal configuration of image reading apparatus 10. Image reading apparatus 10 may be included, for example, in a scanner, copier, or facsimile device, or in a multi-function device (MFD) equipped, for example, with a copier function or a facsimile function. Image reading apparatus 10 is described below with reference to FIGS. 1 and 2.

Referring to FIG. 1, image reading apparatus 10 comprises an apparatus body 11, an auto document feeder (ADF) 12, a document cover 13, and a control panel 14. In FIG. 1, the near-right side of the drawing is a front side of the apparatus, whereas the far-left side of the drawing is a rear side of the apparatus.

As depicted in FIG. 1, apparatus body 11 has a low-profile, parallelepiped shape whose width and length are greater than its height. When image reading apparatus 10 functions as a flatbed scanner (FBS), the upper surface of apparatus body 11 serves as a document holder surface. Although described in detail hereinafter, the upper surface of apparatus body 11 may comprise a contact glass plate 26 (see FIG. 2) that defines the document holder surface. Moreover, apparatus body 11 may comprise an image reading unit 20 (see FIG. 2) disposed therein.

Document cover 13 is disposed above apparatus body 11. Document cover 13 may be connected to apparatus body 11 with a hinge at the rear side of the apparatus. Thus, document cover 13 is openable and closeable with respect to apparatus body 11 in directions indicated by an arrow 66. Document cover 13 may comprise ADF 12. ADF 12 corresponds to a sheet conveyor according to an embodiment of the invention. Further, a document is an example of a sheet to be conveyed by the sheet conveyor.

Control panel 14 may be disposed on the front side of apparatus body 11. Control panel 14 may comprise various control keys 22 and a liquid crystal display 23. Control keys 22 may comprise a start key, a stop key, and various additional keys for use in inputting predetermined operation commands. Image reading apparatus 10 operates in response to a command input through control panel 14. In addition to such a command, image reading apparatus 10 may be connected to a computer and may operate in response to a command sent from the computer through a printer driver or a scanner driver.

Referring to FIG. 2, the upper surface of apparatus body 11 that faces the document cover 13 may comprise contact glass plates 26 and 27. Contact glass plate 27 corresponds to a transparent member according to an embodiment of the invention. Contact glass plates 26 and 27 are disposed side-by-side on the upper surface of apparatus body 11. Although not depicted in FIG. 2, contact glass plates 26 and 27 may be supported by a support rib of apparatus body 11. When document cover 13 is open with respect to apparatus body 11, contact glass plates 26 and 27 are exposed. On the other hand, when document cover 13 is closed with respect to the apparatus body 11, contact glass plates 26 and 27 are covered.

If image reading apparatus 10 is used as an FBS, a document is set on contact glass plate 26. Due to being an optional feature in the present invention, an FBS is not described in further detail. Contact glass plate 27 is used when image reading is performed using ADF 12. A document conveyed by ADF 12 faces contact glass plate 27 in the course of the conveying process.

Contact glass plate 27 may be a flat plate that is narrow in the conveying direction and long in the reading-line direction. The reading-line direction, which is the longitudinal direction of contact glass plate 27, also is referred to as a main scanning direction of image reading unit 20 (e.g., a direction orthogonal to the plane of the drawing in FIG. 2).

Contact glass plate 26 and contact glass plate 27 may have a positioning member 29 interposed therebetween. Positioning member 29 is relatively narrow in the conveying direction and longer in the reading-line direction. The longitudinal length of positioning member 29 may be equal to the longitudinal length of contact glass plate 27. A guide surface 30 may be disposed on the upper surface of positioning member 29. Guide surface 30 is a sloped surface that rises away from contact glass plate 27. With guide surface 30, a document passing over contact glass plate 27 may be guided along a conveying path 43 of ADF 12. Positioning member 29 also may be used as a reference for determining a set position of a document when a document is to be set on contact glass plate 26. The upper surface of positioning member 29 may include indications for the central position and end positions of various document sizes, such as size A4 and size B5.

A guide member 28 may be disposed at a position opposite to positioning member 29 across contact glass plate 27. In other words, guide member 28 may be disposed adjacent to an upstream side of contact glass plate 27 in the conveying direction, whereas positioning member 29 may be disposed adjacent to a downstream side of contact glass plate 27 in the conveying direction. Guide member 28 may be integrated with a frame of apparatus body 11. The upper surface of guide member 28 may comprise a guide surface 31 which is a slope that descends towards contact glass plate 27. In other words, both guide surfaces 30 and 31 may be inclined relative to the surface of contact glass plate 27. A document conveyed along conveying path 43 passes over contact glass plate 27 while being guided by guide surface 30. A detailed description of the guide member 28 is provided below.

Apparatus body 11 may comprise image reading unit 20 disposed therein. Image reading unit 20 may face the lower surfaces of contact glass plates 26 and 27 (e.g., the inner surfaces that are not exposed). Although not depicted in detail in FIG. 2, image reading unit 20 may comprise an image sensor and a carriage. The image sensor may comprise a light source that emits light towards a document through contact glass plates 26 and 27. The image sensor may focus reflected light from the document onto a light-receiving element by means of a lens and convert the light to an electric signal so as to output the electric signal. Examples of an image sensor comprised by image reading unit 20 are a contact image sensor (CIS) and a charge-coupled-device (CCD) type image sensor of a reducing optical system. The carriage carries the image sensor and reciprocates, for example, by means of a belt driving mechanism, below contact glass plates 26 and 27 in directions indicated by an arrow 67 in FIG. 2. When image reading is performed using ADF 12, the image sensor may be shifted to a position below contact glass plate 27 and set on standby. On the other hand, when image reading is performed using the FBS, the image sensor may move parallel to contact glass plate 26.

ADF 12 conveys documents sequentially from a feed tray 41 to a catch tray 42 through conveying path 43. As depicted in FIGS. 1 and 2, document cover 13 may comprise feed tray 41 and catch tray 42. Feed tray 41 and catch tray 42 may be disposed in a two-tiered manner with feed tray 41 being the upper tier.

Referring to FIG. 1, feed tray 41 may comprise a pair of document guides 16. Document guides 16 are slidable in directions for changing the distance therebetween. The distance between document guides 16 may be adjusted in accordance with the width of a document set on feed tray 41. The pair of document guides 16 position a document at a reference position on feed tray 41. For example, a reference position may correspond to the center of feed tray 41 in the width direction thereof in the case of a center registration method, or a reference position may correspond to one side of feed tray 41 in the width direction thereof in the case of a side registration method. Catch tray 42 is integral with the upper surface of document cover 13. In other words, a part of the upper surface of document cover 13 serves as catch tray 42. A document ejected from conveying path 43 may be received by catch tray 42 with the read surface of the document facing downward.

Referring to FIG. 2, conveying path 43 is disposed within ADF 12. Conveying path 43 extends from feed tray 41 to catch tray 42 by passing through a reading position on contact glass plate 27. In the vertical cross-sectional view in FIG. 2, conveying path 43 is substantially C-shaped. Conveying path 43 is a path that comprises a predetermined gap defined by a frame constituting a housing of ADF 12. This gap allows a document to pass therethrough.

A pickup roller 53 and a separation roller 54 are disposed at a position furthest upstream of conveying path 43. Pickup roller 53 is disposed at a tip of an arm 64. Arm 64 is coaxial with separation roller 54 and is rotatable in a direction to permit pickup roller 53 to move into and out of contact with a document on feed tray 41. Separation roller 54 is disposed separate from pickup roller 53 in the conveying direction. Pickup roller 53 and separation roller 54 may be rotated by a driving motor. Arm 64 also may be rotated by a driving motor. The motor is not depicted in FIGS. 1 and 2. Pickup roller 53 and separation roller 54 may have the same diameter and, thus, may rotate at the same circumferential speed. Pickup roller 53 draws in documents set on feed tray 41 and feeds them toward separation roller 54. Separation roller 54 then separates the documents from each other, so that the documents may be fed one-by-one to conveying path 43.

Conveying path 43 comprises conveying rollers 57 to 59 that are arranged at appropriate intervals in the conveying direction. A pinch roller 61 is disposed at a position facing each of conveying rollers 57 to 59. Each pinch roller 61 has a shaft that may be biased elastically with a spring, so that pinch roller 61 is in pressure contact with the roller surface of the corresponding conveying roller 57, 58, or 59. Thus, when conveying rollers 57 to 59 rotate, pinch rollers 61 in pressure contact with these rollers 57 to 59 rotate accordingly. Pinch rollers 61 press a document against conveying rollers 57 to 59, so that the rotational force of conveying rollers 57 to 59 are transmitted to the document.

An ejection roller 60 is disposed at a position furthest downstream of conveying path 43. Similar to conveying rollers 57 to 59, ejection roller 60 may be rotated by a driving motor. A second pinch roller 61' may be disposed at a position facing ejection roller 60 across conveying path 43. This second pinch roller 61' may be biased elastically with a spring, so that second pinch roller 61' is in pressure contact with ejection roller 60.

A platen guide 44 is disposed at a position facing contact glass plate 27. As depicted in FIG. 2, when document cover 13 is closed with respect to apparatus body 11, platen guide 44 faces contact glass plate 27. Platen guide 44 is configured to move into and out of contact with contact glass plate 27, and may be biased elastically with a spring in a direction for moving into contact with contact glass plate 27. Platen guide 44 and contact glass plate 27 may have a gap formed therebetween through which a document may pass.

Figure 3:
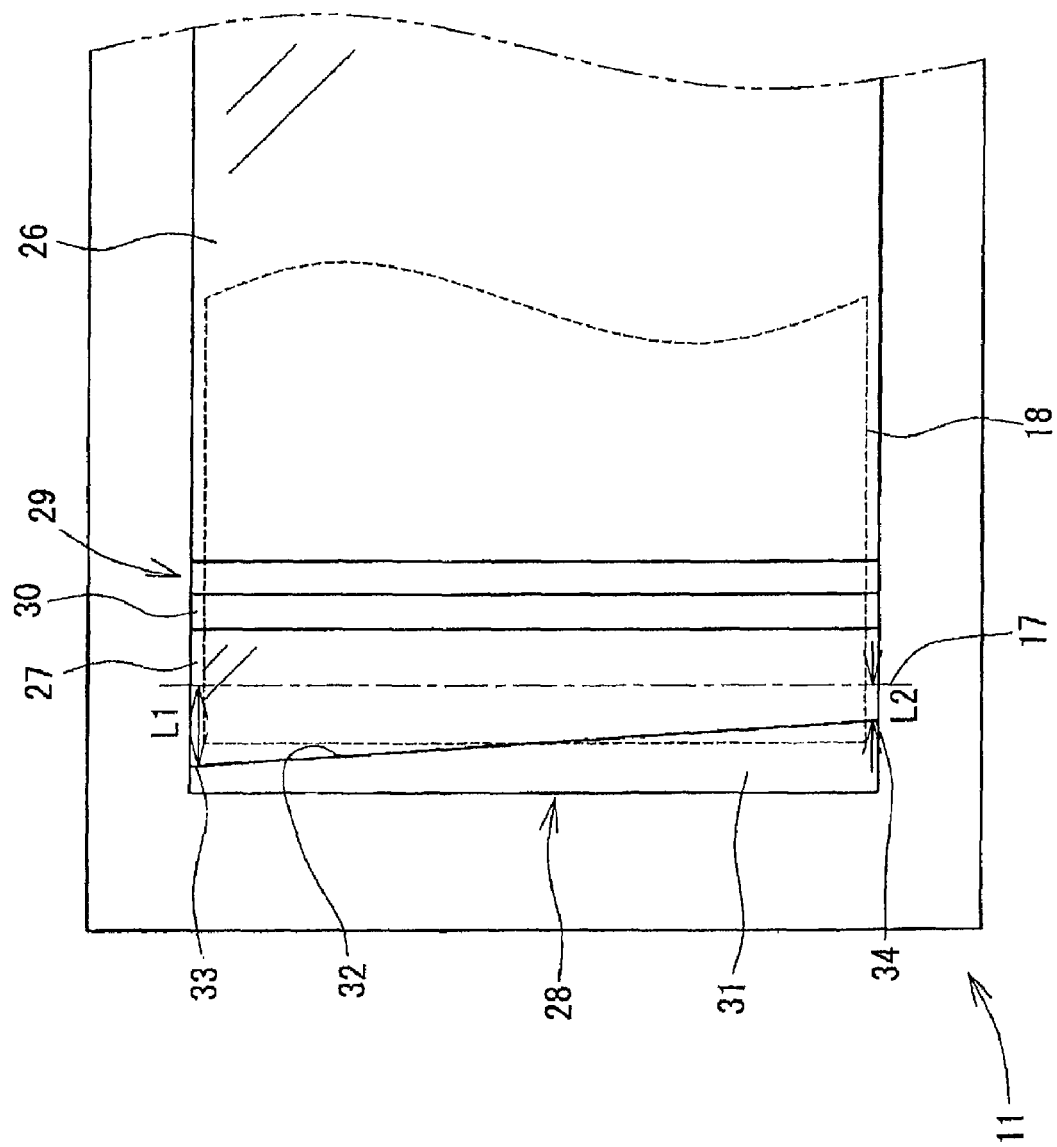
FIG. 3 is a plan view depicting the shape of a guide member 28.

Guide member 28 is described in detail below. FIG. 3 is a plan view depicting the shape of guide member 28. In FIG. 3, components, other than contact glass plates 26 and 27, the guide member 28, and the positioning member 29, are not depicted.

As described above, guide member 28 is integral with the frame of apparatus body 11, and the upper surface of guide member 28 may serve as guide surface 31. In this specification, the downstream end of guide member 28 in the conveying direction is referred to as a guide edge 32. In FIG. 3, the dash-dot line on contact glass plate 27 is a reference line 17. Reference line 17 may be an invisible line on contact glass plate 27 that extends perpendicular to the conveying direction. Reference line 17 may be parallel to the reading line of image reading unit 20. Reference line 17 may be set at any position on contact glass plate 27; for example, reference line 17 may be aligned with the reading line of image reading unit 20.

A distance L from guide edge 32 to reference line 17 varies along the extending direction of reference line 17. Specifically, as depicted in FIG. 3, a distance L1 from an edge section 33 near the rear side of the apparatus (the upper side in FIG. 3) to reference line 17 may be greater than a distance L2 from an edge section 34 near the front side of the apparatus (e.g., the lower side in FIG. 3) to reference line 17 (i.e., L1>L2). With respect to guide edge 32, edge section 33 near the rear side of the apparatus corresponds to a first guide edge, and a first portion of guide member 28 including edge section 33 corresponds to a first guide portion, according to the invention. On the other hand, with respect to guide edge 32, edge section 34 near the front side of the apparatus corresponds to a second guide edge, and a second portion of guide member 28 including edge section 34 corresponds to a second guide portion, according to the invention. In other words, guide member 28 comprises the first guide portion and the second guide portion according to the invention. Further, distance L1 corresponds to a first distance, and distance L2 corresponds to a second distance, according to the invention.

Referring to FIG. 3, guide edge 32 in plan view extends linearly from edge section 33 to edge section 34. Thus, distance L between guide edge 32 and reference line 17 decreases continuously from edge section 33 corresponding to distance L1 to edge section 34 corresponding to distance L2. Thus, when a document is conveyed along conveying path 43, the timing at which the trailing end of the document passes guide edge 32 varies continuously from edge section 33 to edge section 34. In other words, when the trailing end of the document is being guided to contact glass plate 27, the sections of the trailing end at different locations along reference line 17 pass guide edge 32 at different times.

The function of guide member 28 is described below. The dash line depicted in FIG. 3 indicates a trailing-end portion of a document 18 when passing guide edge 32. In this state, the center of the trailing end comes into contact with contact glass plate 27. Document 18, which is conveyed along the conveying path 43, is guided to contact glass plate 27 by guide member 28. Specifically, the leading end of conveyed document 18 is guided onto contact glass plate 27 by traveling along guide surface 31 of guide member 28. Subsequently, the trailing end of document 18 is guided onto contact glass plate 27 by traveling along guide surface 31. Although the shape of document 18 is not particularly limited, rectangular paper is common.

When the trailing end of document 18 passes guide edge 32 of guide member 28, a section of the trailing end of document 18 that is near the rear side of the apparatus first comes into contact with contact glass plate 27. Subsequently, the remaining sections of the trailing end of document 18 come into contact with contact glass plate 27 sequentially from the rear side towards the front side of the apparatus.

More specifically, when the trailing end of document 18 is being guided by guide member 28, a first section of the trailing end that is closest to edge section 33 of guide edge 32 first passes guide edge 32 so as to move onto contact glass plate 27. Subsequently, a second section of the trailing end, located towards edge section 34 relative to the first section, passes guide edge 32 so as to move onto contact glass plate 27. Finally, a third section of the trailing end of the document 18 that is closest to edge section 34 passes guide edge 32 so as to move onto contact glass plate 27. Accordingly, these different sections of the trailing end of document 18 along reference line 17 are guided onto contact glass plate 27 at different times. In other words, the trailing end of document 18 is not guided simultaneously to contact glass plate 27 across the width of document 18 in the direction of reference line 17.

It may occur that guide surface 31 of guide member 28 and the upper surface of contact glass plate 27 have a step therebetween. This step may be provided to increase assembly precision of the components and to prevent the leading end of a document from becoming jammed. Moreover, the sliding friction against document 18 may vary between guide surface 31 and contact glass plate 27. The step and the difference in sliding friction may cause document 18 to behave in a specific manner when the trailing end of document 18 passes guide edge 32. Nevertheless, because the aforementioned sections of the trailing end of document 18 are guided onto contact glass plate 27 by guide member 28 at different times along reference line 17, such behavior of document 18 may be prevented from occurring simultaneously across the width thereof. Accordingly, this mitigates the behavior of document 18 when the trailing end thereof is guided onto contact glass plate 27, thereby stabilizing the orientation of document 18 on contact glass plate 27 and achieving proper image reading without specific reading defects.

Second Embodiment

A second embodiment of the present invention now is described. The second embodiment is similar to the first embodiment except for contact glass plate 27 and guide member 28. For this reason, the descriptions of components, other than the contact glass plate 27 and the guide member 28, is not repeated here.

Figure 4:
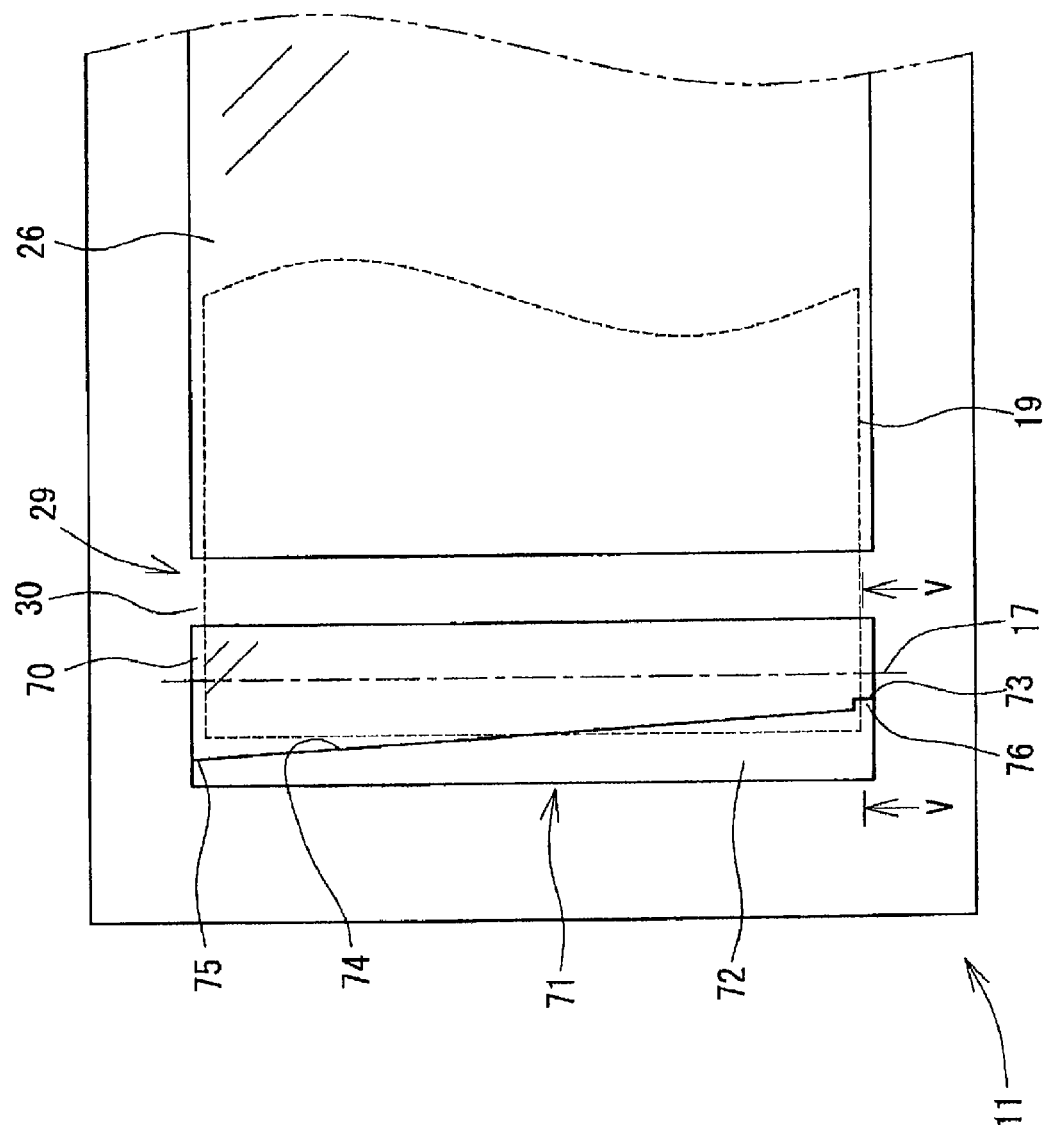
FIG. 4 is a plan view depicting the shapes of a contact glass plate 70 and a guide member 71 according to a second embodiment of the invention.
Figure 5:
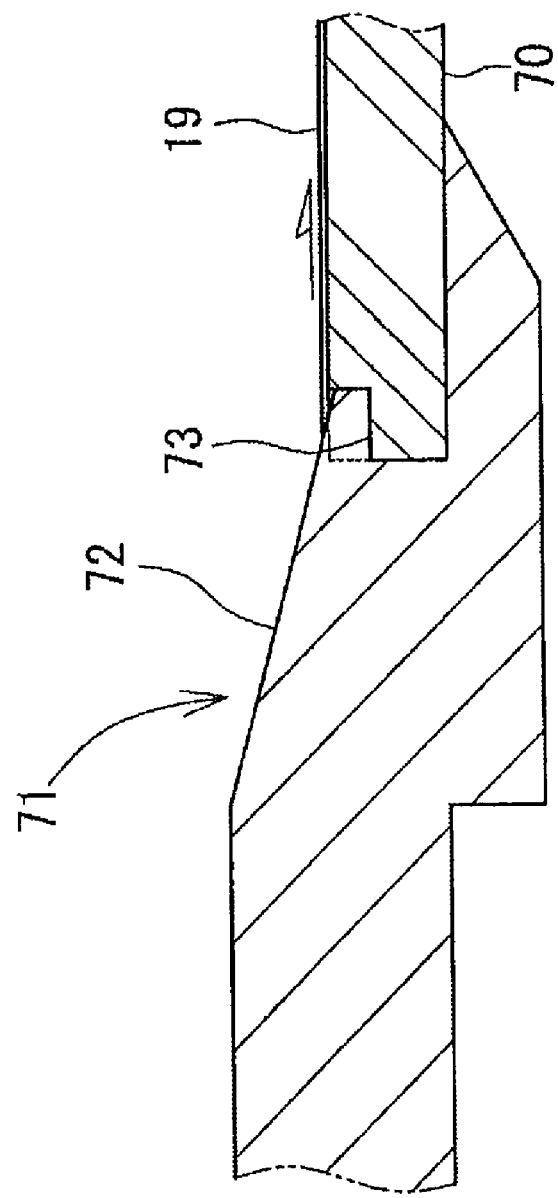
FIG. 5 is a cross-sectional view taken along line V-V in FIG. 4.

A contact glass plate 70 and a guide member 71 according to the second embodiment are described below. FIG. 4 is a plan view depicting the shapes of contact glass plate 70 and guide member 71. FIG. 5 is a cross-sectional view taken along line V-V in FIG. 4. The components, other than contact glass plate 70 and guide member 71, are not depicted in FIGS. 4 and 5. Further, in FIGS. 4 and 5, the components that are given the same reference numerals as those in the first embodiment are the same as those described with respect to the first embodiment. The dash line depicted in FIG. 4 indicates a trailing-end portion of a document 19.

Similar to contact glass plate 27, contact glass plate 70 is exposed at the upper surface of apparatus body 11 and is used when image reading is performed using ADF 12. A document conveyed by ADF 12 faces contact glass plate 70 in the course of the conveying process. Referring to FIG. 4, contact glass plate 70 may be a flat plate that is relatively narrow in the conveying direction and longer in the reading-line direction. Guide member 71 is disposed adjacent to the upstream side of contact glass plate 70 in the conveying direction. Guide member 71 may be integral with the frame of apparatus body 11. The upper surface of guide member 71 comprises with a guide surface 72 which is a slope that descends towards contact glass plate 70.

Referring to FIGS. 4 and 5, contact glass plate 70 has a depression 73 formed therein that is depressed from the surface thereof at a position adjacent to guide member 71 near the front side of the apparatus. Depression 73 may be rectangular, as depicted in the plan view of FIG. 4, and is stepped in the thickness direction of contact glass plate 70, as depicted in the cross-sectional view of FIG. 5. The planar shape and the depth of depression 73 are not particularly limited, and are determined in correspondence with a protruding shape of an edge section 76 described below.

As depicted in FIG. 4, guide member 71 comprises a guide edge 74, and distance L from guide edge 74 to reference line 17 varies along the extension direction of reference line 17. Similar to the first embodiment, distance L1 from an edge section 75 near the rear side of the apparatus (e.g., the upper side in FIG. 4) to reference line 17 is greater than distance L2 from edge section 76 near the front side of the apparatus (e.g., the lower side in FIG. 4) to the reference line 17 (i.e., L1>L2). With respect to guide edge 74, edge section 75 near the rear side of the apparatus corresponds to a first guide edge, and a first portion of guide member 71 comprising edge section 75 corresponds to a first guide portion, according to the invention. On the other hand, with respect to guide edge 74, edge section 76 near the front side of the apparatus corresponds to a second guide edge, and a second portion of guide member 71 comprising the edge section 76 corresponds to a second guide portion, according to the invention. In other words, guide member 71 comprises the first guide portion and the second guide portion, according to the invention. Further, distance L1 corresponds to a first distance, and distance L2 corresponds to a second distance, according to the invention.

Guide edge 74 is substantially linear from edge section 75 to edge section 76. Thus, distance L between guide edge 74 and reference line 17 decreases continuously from edge section 75 to edge section 76. The function of guide edge 74 is substantially the same as that described in the first embodiment.

As depicted in FIGS. 4 and 5, the second portion of guide member 71 comprising edge section 76 protrudes toward reference line 17, such that edge section 76 is fitted into depression 73 of contact glass plate 70. The protruding shape of the second portion of guide member 71 comprising edge section 76 is rectangular in plan view, which corresponds to the planar shape of depression 73. The thickness of guide member 71 at edge section 76 is less than the depth of depression 73. Consequently, guide surface 72 at edge section 76 extends to a position lower than the upper surface of contact glass plate 70. Although not depicted in FIG. 5, guide surface 72 at the remaining sections of guide edge 74, excluding edge section 76, is disposed equal to or greater than the height of the upper surface of contact glass plate 70.

Similar to the first embodiment, document 19, as it is conveyed along conveying path 43, is guided to contact glass plate 70 by guide member 71. Moreover, the different sections of the trailing end of document 19 along reference line 17 are guided to contact glass plate 70 at different times. Thus, the second embodiment is similar to the first embodiment in that the behavior of document 19 may be mitigated and that the orientation of document 19 on contact glass plate 70 may be stabilized.

When the aforementioned sections of the trailing end of document 19 sequentially pass guide edge 74, the section of the trailing end near the front side of the apparatus lastly passes edge section 76 before moving onto contact glass plate 70. In the second embodiment, document 19 is conveyed along conveying path 43 on the basis of a side registration method in which a side proximate to the front side of the apparatus is set as a reference position.

Referring to FIG. 5, when the trailing end of document 19 moves onto the contact glass plate 70, the section of the trailing end near the front side of the apparatus slides downward along guide surface 72. As described above, guide surface 72 at edge section 76 extends to a position lower than the upper surface of contact glass plate 70. Consequently, just before the trailing end of document 19 slides completely onto guide surface 72, the trailing end becomes positioned at the same height as the upper surface of contact glass plate 70. This prevents document 19 from behaving as if it fell down a step when the last section of the trailing end of document 19 is moved from guide member 71 onto contact glass plate 70. Accordingly, document 19 may be guided smoothly onto contact glass plate 70.

In the first and second embodiments described above, guide edges 32 and 74 of guide members 28 and 71 extend linearly from edge sections 33 and 75 to edge sections 34 and 76. Nevertheless, in the present invention, the guide edge between the first guide portion and the second guide portion is not necessarily linear. FIGS. 6A to 6C depict other examples of the shapes of the guide edge, in which the distance between the guide edge and reference line 17 varies continuously between the first guide portion and the second guide portion. In FIGS. 6A to 6C, components, other than the guide member and the contact glass plate, are not depicted.

FIG. 6A depicts an example of a shape of a guide member 81, in which distance L from a guide edge 82 to reference line 17 on a contact glass plate 80 is greatest at the center of guide member 81 and decreases towards the opposite edge sections. In guide member 81, a first portion of guide member 81 comprising a central section 83 of guide edge 82 corresponds to a first guide portion according to the present invention, and a second portion of guide member 81 comprising opposite edge sections 84 and 85 of guide edge 82 corresponds to a second guide portion according to the present invention. Guide edge 82 curves continuously from the central section 83 towards opposite, edge sections 84 and 85.

FIG. 6B depicts an example of a shape of a guide member 91, in which distance L from a guide edge 92 to reference line 17 on a contact glass plate 90 is greater at the opposite edge sections of guide member 91 and decreases towards the center. In guide member 91, a first portion of the guide member 91 comprising opposite, edge sections 93 and 94 of guide edge 92 corresponds to a first guide portion, and a second portion of guide member 91 comprising a central section 95 of guide edge 92 corresponds to a second guide portion, according to the invention. Guide edge 92 curves continuously from opposite, edge sections 93 and 94 towards central section 95.

FIG. 6C depicts an example of a shape of a guide member 101 in which distance L from a guide edge 102 to reference line 17 on a contact glass plate 100 varies periodically in the width direction of guide member 101 (e.g., in the left-right direction in FIG. 6C). Guide member 101 may comprise five first guide portions 103 to 107 in the width direction of guide edge 102 and four second guide portions 108 to 111 in the width direction of guide edge 102. Second guide portions 108 to 111 may be arranged alternately between first guide portions 103 to 107. First guide portions 103 to 107 and second guide portions 108 to 111 also may be arranged at equal intervals in the width direction. Guide edge 102 curves continuously from the neighboring first guide portions 103 to 107 towards the corresponding second guide portions 108 to 111.

By applying guide edges 82, 92, and 102 depicted in FIGS. 6A to 6C to the first and second embodiments, similar advantages may be achieved. Although each of FIGS. 6A to 6C depicts a shape of a guide edge, in which the distance from the guide edge to the reference line varies continuously between the first guide portion(s) and the second guide portion(s), the guide edge may alternatively have a shape in which the distance from the guide edge to the reference line varies in a discontinuous manner, such as in a step-wise manner or a comb-like manner.

Third Embodiment

A third embodiment of the present invention now is described. The third embodiment is similar to the first embodiment, except for guide member 28. For this reason, the descriptions of components, other than the guide member 28, are not repeated here.

Figure 7:
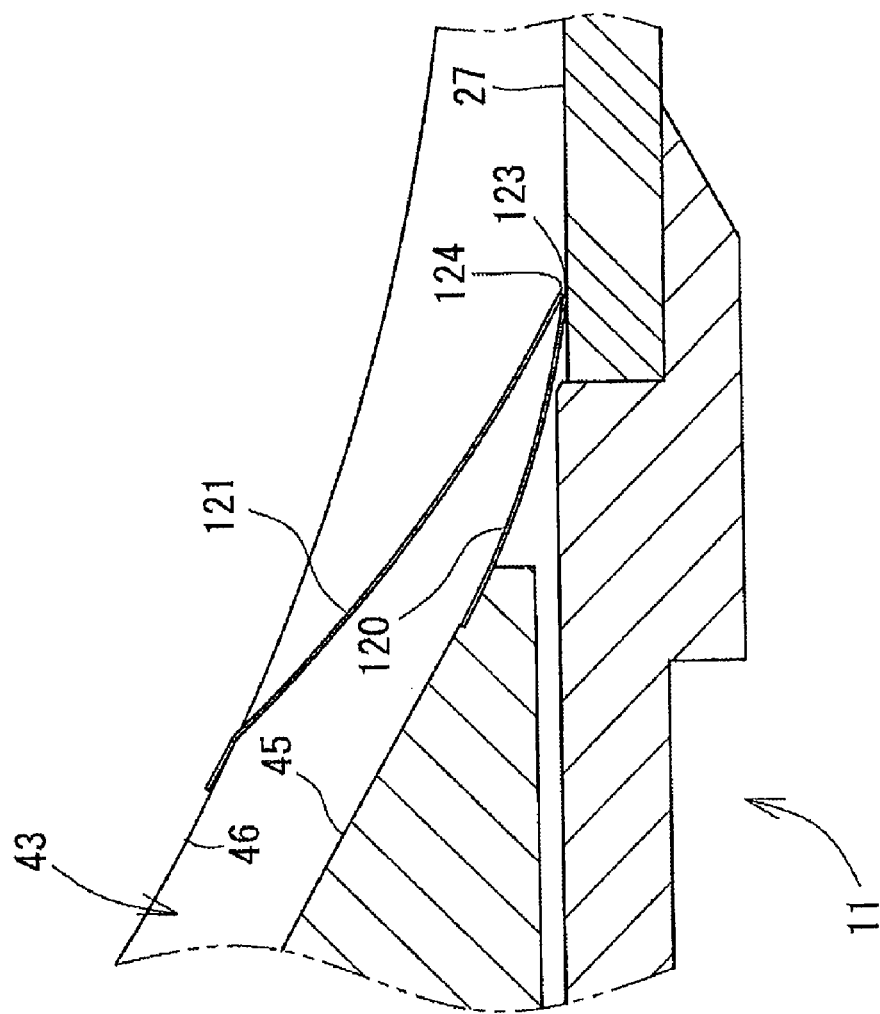
FIG. 7 is a cross-sectional view depicting a sectional configuration of guide members 120 and 121 and their surrounding components according to a third embodiment of the invention.

Guide members 120 and 121 according to the third embodiment are described below. FIG. 7 is a cross-sectional view depicting a sectional configuration of guide members 120 and 121 and their surrounding components. Although components, other than guide members 120 and 121 and their surrounding components, are not depicted in FIG. 7, significant components of ADF 12 are the same as those in the first embodiment. Further, in FIG. 7, the components that are given the same reference numerals as those in the first embodiment are the same as those described in the first embodiment.

In the third embodiment, guide member 28 is not provided upstream of contact glass plate 27 in the conveying direction. Instead, guide member 28 is replaced with guide members 120 and 121. Consequently, the upper surface of apparatus body 11 occupies the upstream side of contact glass plate 27 in the conveying direction. Thus, a document is not guided along this upper surface.

Referring to FIG. 7, guide members 120 and 121 are disposed on conveying path 43 at positions upstream of contact glass plate 27 in the conveying direction. Guide members 120 and 121 respectively have guide edges 123 and 124 that are disposed on contact glass plate 27. Each of guide members 120 and 121 may be formed of an elastically deformable film, such as a film composed of synthetic resin, and may have substantially the same width as contact glass plate 27 (e.g., in a direction orthogonal to the plane of drawing in FIG. 7).

The first end of guide member 120 adheres to a lower guide surface 45 of conveying path 43. A second end of guide member 120 defines a guide edge 123 that is disposed on contact glass plate 27. On the other hand, the first end of guide member 121 adheres to an upper guide surface 46 of conveying path 43. A second end of the guide member 121 defines a guide edge 124 that is disposed on contact glass plate 27. Guide members 120 and 121 form an opposing pair and face each other like guide surfaces 45 and 46. The distance that separates guide members 120 and 121 from each other gradually decreases downstream in the conveying direction and finally approaches or becomes zero where guide edges 123 and 124 adjoin. Consequently, a document being conveyed along conveying path 43 enters between guide members 120 and 121 and passes through between guide edges 123 and 124 to finally reach contact glass plate 27. Because guide edges 123 and 124 are disposed on contact glass plate 27, a document passing between guide edges 123 and 124 may be guided onto contact glass plate 27.

Although not depicted in FIG. 7, guide edges 123 and 124 of guide members 120 and 121 may have a shape as described in the first embodiment or in one of the modified examples depicted in FIGS. 6A to 6C. For example, if guide edges 123 and 124 have the same shape as guide edge 32 depicted in FIG. 3, distance L from each of guide edges 123 and 124 to reference line 17 may vary along the extending direction of reference line 17. Specifically, for each of guide edges 123 and 124, distance L1 from the edge section thereof near the rear side of the apparatus to reference line 17 is greater than distance L2 from the edge section thereof near the front side of the apparatus to reference line 17. Consequently, when a document is conveyed along conveying path 43, the timing at which trailing end of the document passes guide edges 123 and 124 may vary continuously along reference line 17. In this manner, the third embodiment may achieve similar advantages to those in the first embodiment.

Although the guide members of the present invention are defined by a pair of elastically deformable films in the third embodiment, guide members having substantially the same shapes as guide members 120 and 121 may be defined by a pair of brushes in place of films.

Although embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. An image reading apparatus comprising:
   a sheet conveyor comprising:
      a conveying path along which a sheet is conveyed in a conveying direction;
      a transparent member comprising a surface facing the conveying path; and
      a guide member comprising a downstream continuous edge line which extends continuously and is disposed at a downstream end of the guide member with respect to the conveying direction, such that a distance from the downstream continuous edge line to a reference line varies in a direction in which the reference line extends,
      wherein the reference line is parallel to the surface of the transparent member and is perpendicular to the conveying direction; and
   an image sensor configured to read an image on the sheet conveyed along the conveying path through a portion of the transparent member,
   wherein the guide member is disposed upstream, with respect to the conveying direction, of the portion of the transparent member.

2. The image reading apparatus according to claim 1, wherein the distance from the downstream continuous edge line to the reference line varies continuously in the direction in which the reference line extends.

3. The image reading apparatus according to claim 2, wherein the distance from the downstream continuous edge line to the reference line decreases continuously in the direction in which the reference line extends.

4. The image reading apparatus according to claim 2, wherein the downstream continuous edge line comprises at least one straight edge.

5. The image reading apparatus according to claim 2, wherein the downstream continuous edge line comprises at least one curved edge.

6. The image reading apparatus according to claim 5, wherein the at least one curved edge is symmetric with respect to a centerline which extends in the conveying direction.

7. The image reading apparatus according to claim 2, wherein the distance from a center of the downstream continuous edge line to the reference line is a maximum distance.

8. The image reading apparatus according to claim 2, wherein the downstream continuous edge line comprises a point at which the distance from the downstream continuous edge line to the reference line is a maximum distance, the distance from the downstream continuous edge line to the reference line decreases continuously from the maximum distance toward each side.

9. A sheet conveyor comprising:
   a conveying path along which a sheet is conveyed;
   a transparent member comprising a surface facing the conveyed path; and
   a guide member comprising a downstream continuous edge line which extends continuously and is disposed at a downstream end of the guide member, such that a distance from the downstream continuous edge line to a reference line varies in a direction in which the reference line extends,
   wherein the reference line is parallel to the surface of the transparent member and is perpendicular to the conveying direction,
   wherein the distance from the downstream continuous edge line to the reference line varies continuously in the direction in which the reference line extends, and
   wherein the distance from the center of the downstream continuous edge line to the reference line is a minimum distance.

10. A sheet conveyor comprising:
    a conveying path along which a sheet is conveyed;
    a transparent member comprising a surface facing the conveyed path; and
    a guide member comprising a downstream continuous edge line which extends continuously and is disposed at a downstream end of the guide member, such that a distance from the downstream continuous edge line to a reference line varies in a direction in which the reference line extends,
    wherein the reference line is parallel to the surface of the transparent member and is perpendicular to the conveying direction, and
    wherein the height of the downstream continuous edge line at a point at which the distance from the downstream continuous edge line to the reference line is a maximum distance is less than or equal to the height of the surface of the transparent member.

11. A sheet conveyor comprising:
    a conveying path along which a sheet is conveyed in a conveying direction;

a transparent member comprising a surface facing the conveying path; and a guide member comprising a downstream continuous edge line which extends continuously and is disposed at a downstream end of the guide member with respect to the conveying direction, such that a distance from the downstream continuous edge line to a reference line varies in a direction in which the reference line extends, wherein the reference line is parallel to the surface of the transparent member and is perpendicular to the conveying direction, wherein the guide member is disposed at an upstream end of the transparent member.

* * * * *